United States Patent [19]

Uemura et al.

[11] Patent Number: 4,999,617
[45] Date of Patent: Mar. 12, 1991

[54] DEVICE FOR READING PATTERNS DISPLAYED ON A DISPLAY UNIT

[75] Inventors: Susumu Uemura, Kyoto; Tadashi Tomino, Yamatokoriyama; Hiroshi Tsujioka, Nara; Shigeo Yoneda, Yamatokoriyama; Shigeru Shindoh, Yamatokoriyama; Yasuhumi Yatsuzuka, Yamatokoriyama, all of Japan

[73] Assignee: Sharp Kabushiki Kaisha, Osaka, Japan

[21] Appl. No.: 287,542

[22] Filed: Dec. 19, 1988

Related U.S. Application Data

[63] Continuation of Ser. No. 922,939, Oct. 24, 1986, abandoned.

[30] Foreign Application Priority Data

| Oct. 24, 1985 | [JP] | Japan | 60-240164 |
| Oct. 25, 1985 | [JP] | Japan | 60-239671 |
| Oct. 25, 1985 | [JP] | Japan | 60-239672 |
| Oct. 25, 1985 | [JP] | Japan | 60-164652[U] |
| Oct. 25, 1985 | [JP] | Japan | 60-164653[U] |
| Oct. 29, 1985 | [JP] | Japan | 60-244815 |
| Oct. 29, 1985 | [JP] | Japan | 60-244816 |
| Nov. 21, 1985 | [JP] | Japan | 60-263273 |
| Dec. 23, 1985 | [JP] | Japan | 60-294971 |
| Dec. 23, 1985 | [JP] | Japan | 60-294973 |

[51] Int. Cl.$^5$ .................................... H04N 7/00
[52] U.S. Cl. ................................ 340/706; 340/707; 358/142; 235/471
[58] Field of Search .......... 340/707, 706, 708, 712; 358/139, 10, 142; 235/462, 471, 437, 472; 250/568, 566, 549; 362/418

[56] References Cited

U.S. PATENT DOCUMENTS

| 2,691,721 | 10/1954 | Bornhuetter | 362/418 |
| 3,292,489 | 12/1966 | Johnson et al. | 340/712 |
| 3,401,331 | 9/1968 | Mussulman | 358/139 |
| 3,780,271 | 12/1973 | Sharkitt et al. | 235/437 |
| 3,801,775 | 4/1974 | Acker | 235/471 |
| 3,949,233 | 4/1976 | Gluck | 235/462 |
| 3,984,862 | 10/1976 | Volz | 358/139 |
| 4,143,809 | 3/1979 | Uebbing et al. | 235/462 |
| 4,239,684 | 5/1982 | Monteath et al. | 340/712 |
| 4,454,417 | 6/1984 | May | 340/707 |
| 4,613,904 | 9/1986 | Lurie | 358/142 |

FOREIGN PATENT DOCUMENTS

| 0137927 | 8/1992 | Japan | 340/707 |
| 2143975 | 2/1985 | United Kingdom | 340/706 |

Primary Examiner—Alvin E. Oberley

[57] ABSTRACT

A coded information reading device for reading code pattern displayed on a CRT display unit of a television receiver and for outputting information signals corresponding to the code pattern includes a suction cup to be attached to the surface of the CRT display unit and a photo sensor integrally installed in the suction cup for reading the code pattern displayed on the CRT display unit.

18 Claims, 13 Drawing Sheets

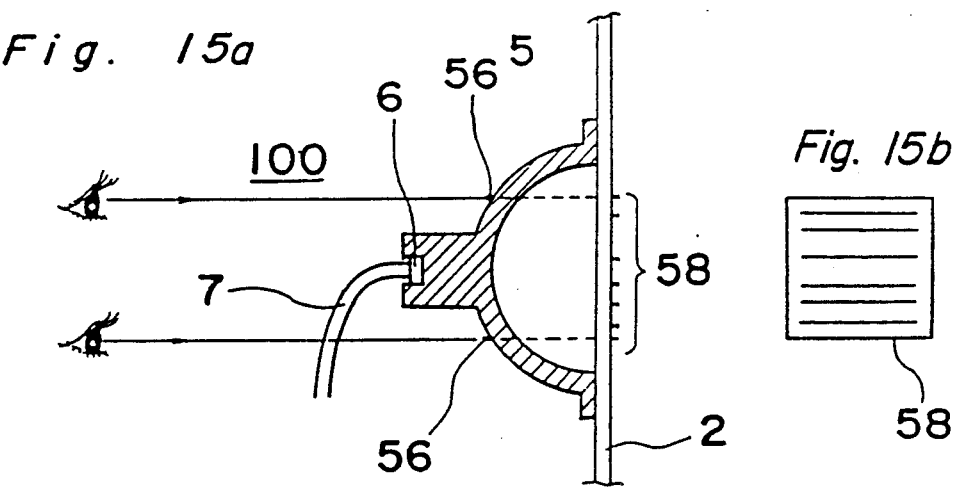
Fig. 15a
Fig. 15b
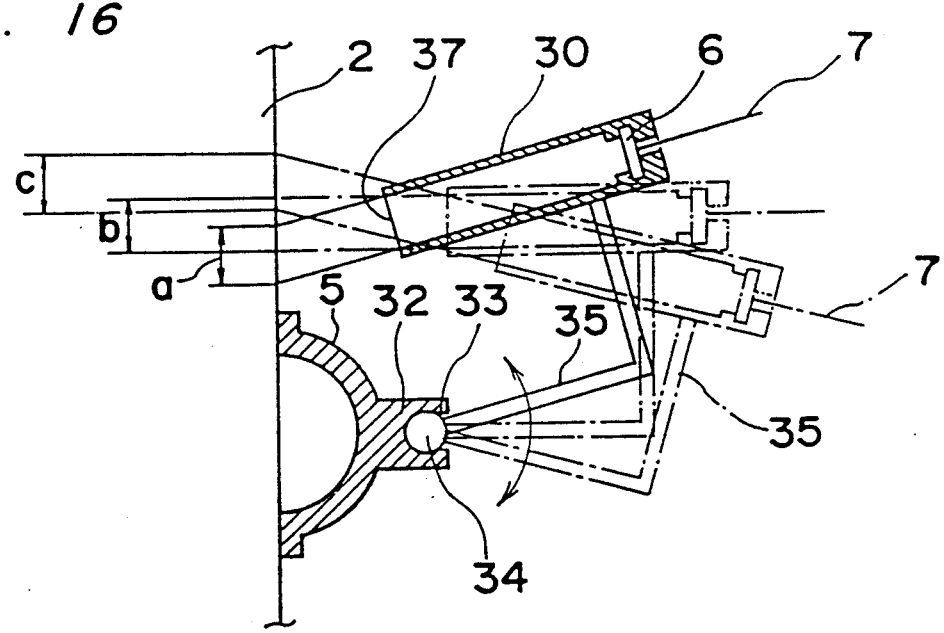
Fig. 16
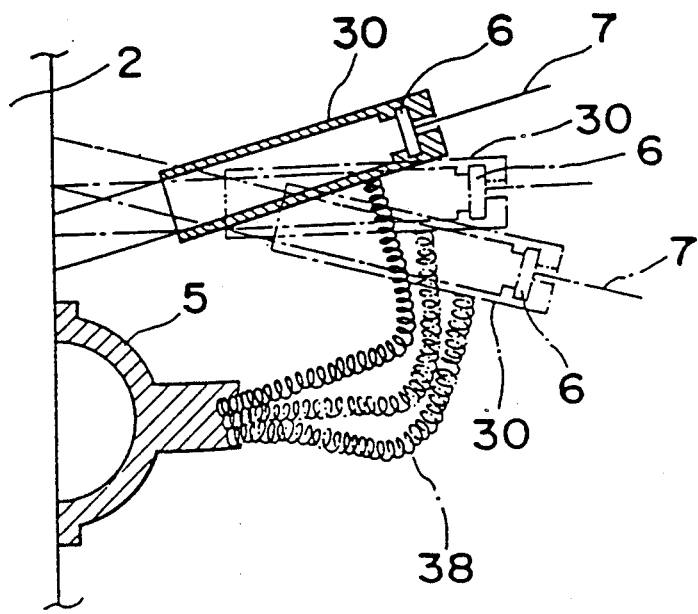
Fig. 17 time (sec)

DEVICE FOR READING PATTERNS DISPLAYED ON A DISPLAY UNIT

This application is a continuation of application Ser. No. 06/922,939, filed on Oct. 24, 1986, now abandoned.

BACKGROUND OF THE INVENTION

FIELD OF THE INVENTION

The present invention relates to a coded information reading a device for reading code pattern displayed on a display unit such as a CRT display unit of a television receiver.

It is known to display a pattern of coded information in the form of a bar code on a part of a CRT display unit of a consumer's television receiver. The displayed pattern is read by an information reader provided at the consumer's side and the information read by the information reader is applied to a printer for visually printing the coded information.

An advantage of the information processing device mentioned above is that the consumer can obtain coupon tickets, which will be delivered by a sponsor of the TV program, at the consumer's home by reading the bar code pattern displayed on the television receiver, thereby printing the bar code on a sheet of paper.

In using the information processing device mentioned above, it is desired to directly and correctly read the code pattern on the CRT display unit without disturbing the consumer's viewing the usual program displayed on the main part of the CRT display unit of the television receiver. Therefore the information reader for reading the code pattern on the CRT must be as compact as possible.

Moreover, although the area of displaying the code pattern on the CRT display unit is fixed, the size and position of the displayed code pattern may be changed depending on the type of TV receiver.

SUMMARY OF THE INVENTION

An essential object of the present invention is to provide an information reading device which is compact and easily attached to a television receiver.

Another object of the present invention is to provide an information reading device which can read the information correctly despite the fact that the position and the size of the pattern displayed on the television receiver has changed.

A further object of the present invention is to provide an information reading device wherein the position and scope of the information reader can easily be manually or automatically be adjusted so as to read a pattern even if the position and/or size of the pattern on the TV receiver change.

A still further object of the present invention is to provide an information reading device which can read coded information correctly.

According to the present invention, there is provided a coded information reading device for reading code patterns displayed on a display unit and for outputting an information signal corresponding to the code pattern, which comprises a suction cup to be attached to the display unit, and a photo sensor integrally installed in the suction cup for reading the code pattern displayed on the display unit.

These and other objects and features of the present invention will be described in the detailed description of the preferred embodiments with reference to the attached drawings.

BRIEF DESCRIPTION OF THE DRAWINGS

FIGS. 16 to 18 are cross sectional view showing further examples of the coded information reading device according to the present invention.

DETAILED DESCRIPTION OF THE PREFERRED EMBODIMENTS

Figure 1:
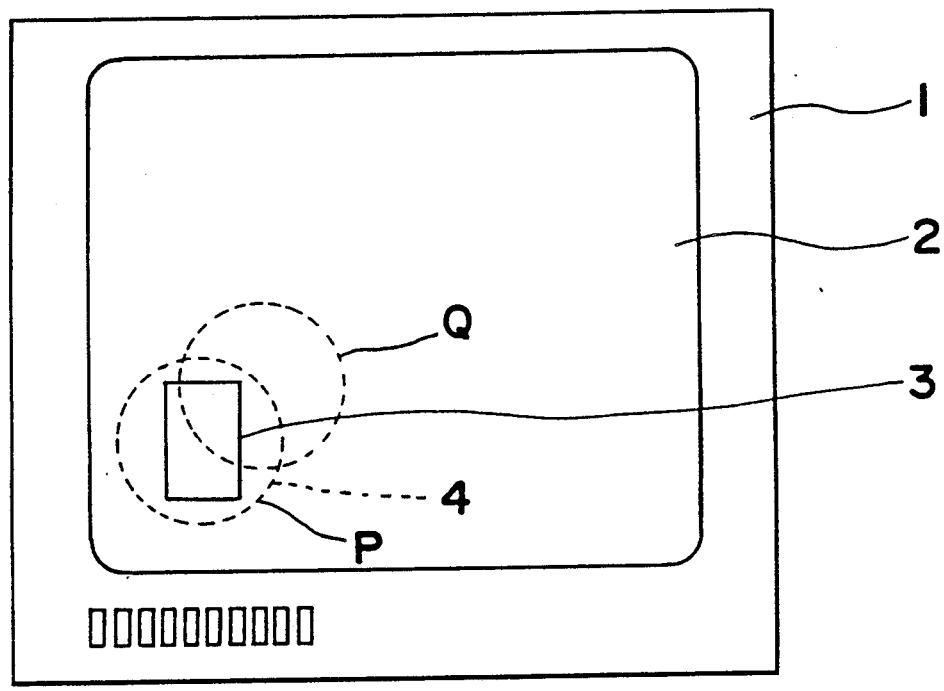
FIG. 1 is a front view of a television receiver in which a code pattern is displayed.

Referring to FIG. 1, a television receiver 1 of NTSC system, PAL system or other systems comprises CRT display unit 2 which includes a code display area 3 for displaying a code pattern in the form of a bar code representing characters or patterns transmitted from a transmitting unit such as a commercially available broadcasting station (not shown). In the code display area 3, a code pattern transmitted from the broadcasting station can be visually displayed in any suitable form which can be printed by the user. A coded information reading device according to the present invention can be attached to a circular area 4 surrounded by dotted lines on the display display unit 2.

Figure 2:
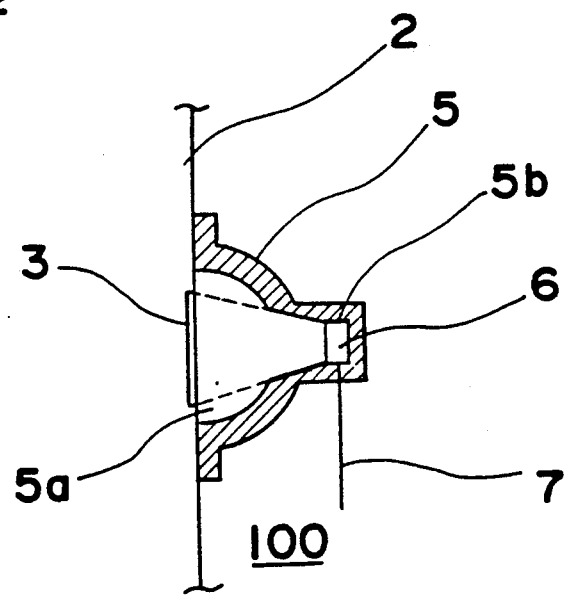
FIG. 2 is a cross sectional view of an example of a suction cup used for a coded information reading device according to the present invention.

A first example of the coded information reading device 100 according to the present invention is shown in FIG. 2, wherein a suction cup 5 has a semi spherical cup shape with an opening 5a and is made of a soft and resilient material such as rubber or plastic resin. The diameter of the opening 5a of the suction cup 5 is larger than the code display area 4 so as to cover the code display area 3. The suction cup 5 has its top portion projected in a small cylindrical shape to form a small chamber 5b for accommodating a photo sensor 6 which senses the coded pattern displayed in the code display area 3. The photo sensor 6 is installed in the chamber 5b having its light sensing face directed toward the opening 5a so that the photo sensor 6 can read the coded pattern displayed on the CRT display unit 2. The photo sensor 6 may be installed in the chamber 5b at the time of molding of the suction cup 5. The photo sensor 6 may be bonded to the inner wall of the chamber 5b after the suction cup 5 is molded. The output signal of the photo sensor 6 is fed to a signal processor by conductor 7.

The suction cup 5 is fitted to the surface of the CRT display unit 2 by way of a vacuum suction force in such a position that the opening 5a of the suction cup 5 covers the code display area 3 whereby the photo sensor 6 can read the coded pattern displayed on the CRT display unit 2. Then the photo sensor 6 generates a series of pulses corresponding to the presence and absence of the coded pattern by taking the output of a photo sensor 6 at the predetermined period which is determined to be synchronous with the period of the scanning lines on the CRT display unit 2.

According to the coded information reading device using the suction cup 5 as mentioned above, the geometric relation between the code display area d and the photo sensor 6 can be kept unchanged once the suction cup 5 is secured to the CRT display unit 2, thus the accuracy of reading the coded pattern can be improved and the reliability of the signal sensor can be improved. In addition the suction cup 5 can be easily set in position of the CRT display unit with a compact shape.

Figure 3:
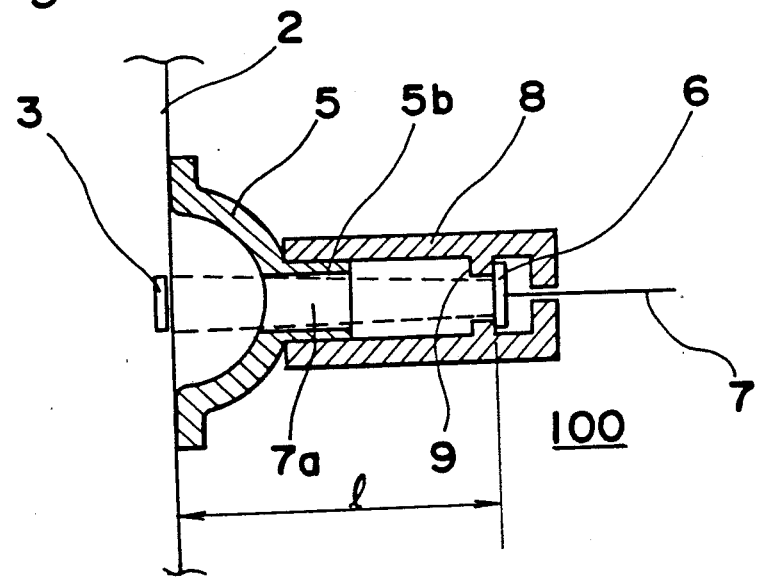
FIG. 3 is a cross sectional view of another example of the coded information reading device according to the present invention.

Another example of the coded information reading device 100 is shown in FIG. 3. There is used the suction cup 5 which is similar to that shown in FIG. 2 except that the photo sensor 6 is removed and a through hole 7a is defined through the cylindrical portion 5b projected on the top portion of the suction cup 5. A light guide tube 8 is integrally connected with the suction cup 5 by fitting one end of the light guide tube 8 to the cylindrical portion 5b in the coaxial relation. The photo sensor 6 is installed in another end portion of the light guide tube 8. The photo sensor 6 is secured to an annular flange 9 radially inwardly projected from the inner surface of the other end portion of the light guide tube 8. In order to shut out the external light, it is desired that the suction cup 5 and the light guide tube 8 are blackened.

The suction cup 5 and light guide tube 8 may be formed separately and connected together or molded integrally.

The suction cup 5 is fitted to the surface of the CRT display unit 2 by way of vacuum suction force in such a position that the opening 5a of the suction cup 5 covers the code display area 3 whereby the photo sensor 6 can read the coded pattern displayed on the CRT display unit 2 through the suction cup 5 and light guide tube 8. In this embodiment, since the distance $\lambda$ between the surface of the CRT display unit 2 and the photo sensor 6 is long, the external light entering the suction cup through the gap between the suction cup 5 and the surface of the display unit 2 scarcely reaches the photo sensor 6, thus it is assured that the coded pattern displayed on the CRT display unit 2 will be accurately detected.

Figure 6:
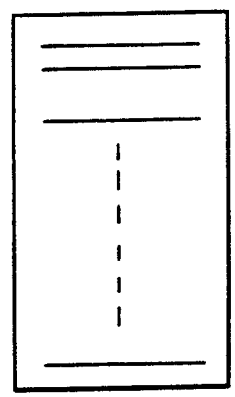
FIG. 6 is a front view showing an example of the code pattern displayed on the television receiver.

The code pattern shown in FIG. 6 is displayed on one corner portion of the CRT display unit 2 of the television receiver 1 simultaneously when a commercial message or picture transmitted from the broadcasting station is received on the television receiver 1. The code pattern can be read by attaching the coded information reading device according to the present invention to the portion P (see FIG. 1) on the CRT display unit 2.

Figure 7:
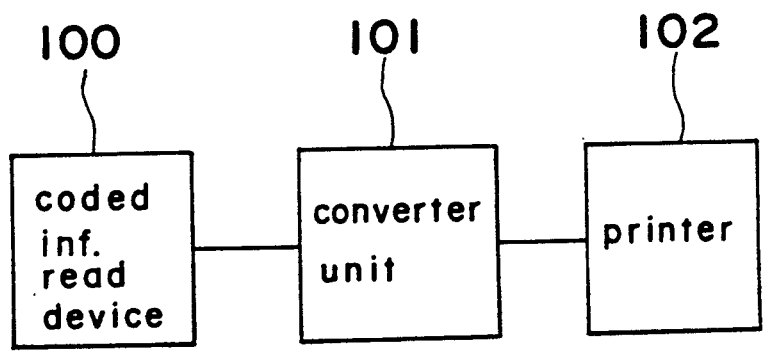
FIG. 7 is a block diagram showing an example of the circuit used with the coded information reading device according to the present invention.

In FIG. 7, the output of the coded information reading device 100 is connected to a converter unit 101 which is connected to a printer 102. The printer 102 prints the coded pattern such as a bar code as shown in FIG. 6. The printed sheet can be used as a coupon.

In case the coded information reading device 100 is erroneously attached at the position Q as shown in FIG. 1, where the scope of the device 100 is misaligned with a part of or the entire code pattern, the correct code signal can not be obtained.

The following embodiment can detect whether or not the coded information reading device 100 is set at a correct position P and if it is set at the position Q there is produced a warning signal.

Figure 4:
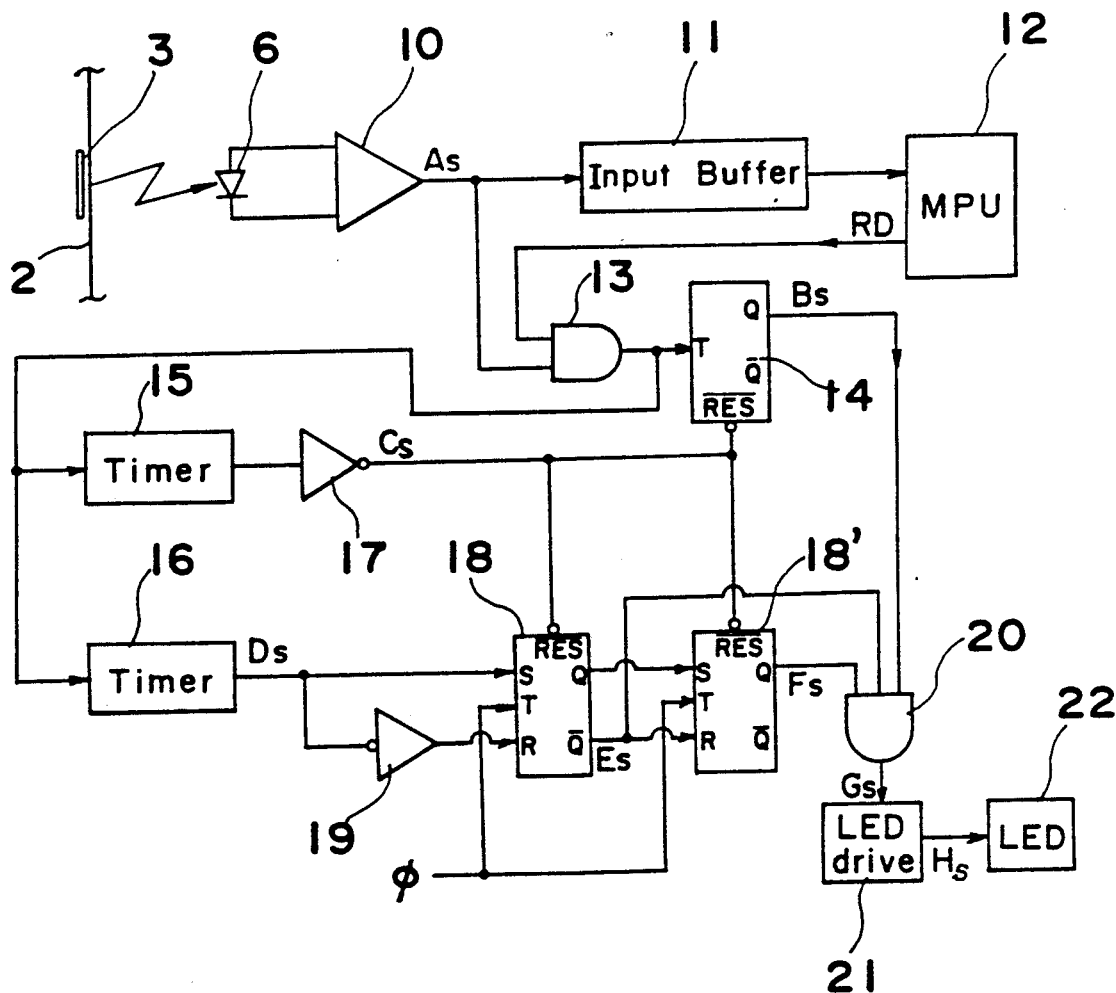
FIG. 4 is a block diagram of a data processing device for processing the signal obtained by the coded information reading device according to the present invention, FIGS. 5 (a) and (b) are schematic diagrams showing various wave forms appearing on the essential portions of the circuit shown in FIG. 4.

Referring to FIG. 4, showing a circuit diagram for processing the output signal from the coded information reading device, the photo sensor 6 is connected to an amplifier 10 for amplifying the output signal of the photo sensor 6. The output of the amplifier 10 is connected to an input buffer 11 and an AND gate 13. The output of the input buffer 11 is connected to an MPU (main processing unit) 12 which reads the contents of the input buffer 11 to detect the start code (START CODE) in the transmitted data. (The START CODE is located in the leading portion of the code transmitted first from the broadcasting station and contained in the leading edge portion of the transmitted data). When the MPU 12 detects the START CODE, the MPU 12 generates a RD signal of high level (referred to as High hereinafter). In case the MPU 12 does not detect the START CODE, the RD signal of the MPU 12 is low level (referred to as Low hereinafter). Low RD signal represents that positioning of the photo sensor 6 is incorrect. Even if RD signal is High but the positioning of the photo sensor 6 is still incorrect, this fact is warned.

The START CODE is composed of 16 bits and is displayed by one or more horizontal bar codes lined up in a vertical direction on the CRT display unit 2. After the START CODE is repeated a plurality of times, the code signal to be outputted to the output device such as a printer is broadcasted from the broadcasting station. In the embodiment shown, the correction (correct or error) of the detected coded signals is judged by the parity check method. Namely, in case the number of High data of the detected coded signal is odd, it is dealt that the detection of the coded signal is correct, but in case the number of High data of the detected coded signal is even, it is dealt that the detection of the coded signal is false.

When the RD signal is High, the AND gate 13 is enabled to pass the signal A of the amplifier 10 to a T terminal of a T type flip flop 14, which consecutively reverses its states every time the signal $A_s$ becomes High and is applied to the terminal T. The Q output of the flip flop 14 is referred to as signal $B_s$ shown in FIG. 5 B.

Figure 5:
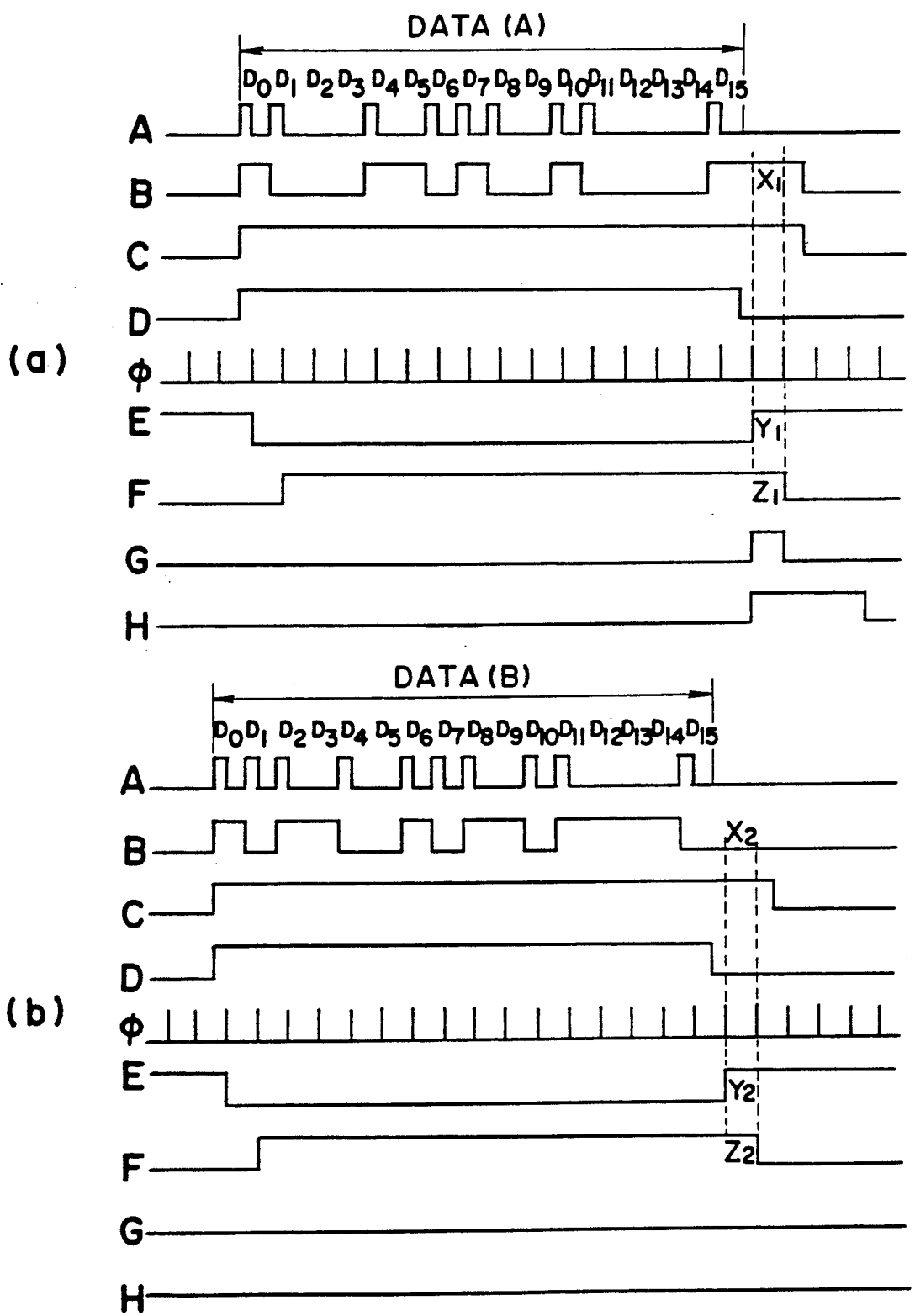

Timers 15 and 16 are also connected to the output of the AND gate 13. Both of the timers 15 and 16 normally generate High outputs, but their outputs become Low when the AND gate 13 is opened and the timers 15 and 16 continue Low outputs for predetermined periods of time respectively. The output of the timer 15 is inverted by an inverter 17 to output the signal $C_s$ as shown in FIG. 5 C.

While the output $D_s$ (see FIG. 5 D) of the timer 16 is fed to S input of an RST flip flop 18, the signal $D_s$ is inverted by an inverter 19 and fed to the R input of the flip flop 18. The signal $D_s$ is used to perform a parity check after completion of reading of the data D0, D1, D2 D15.

A series of clock pulses $\phi$ are applied to the T terminal of the flip flop 18 so that the Q and $\overline{Q}$ outputs can be decided depending on the state of the combination of the signal D and its inverted signal and the clock $\phi$. The $\overline{Q}$ output of the flip flop 18 is represented as the signal $E_s$ (FIG. 5 E). The Q and $\overline{Q}$ outputs of the flip flop 18 are fed to the S input and R input of a further RST flip flop 18'. The clock pulses $\phi$ are also applied to the T terminal of the further flip flop 18 the output of which is shown by the signal F shown in FIG. 5 F.

An AND gate 20 conducts a logic product of the signals $B_s$, $E_s$ and $F_s$ and the output signal $G_s$ (see FIG. 5 G) of the AND gate 20 is applied to an LED drive circuit 21.

The LED drive circuit 21 generates High signal when the signal $G_s$ is High i.e., the signals $B_s$, $E_s$ and $F_s$ are all High. The output of the LED drive circuit 21 is represented by H shown in FIG. 5 H.

A light emitting diode (referred to as LED) 22 is turned on upon receipt of High signal from the LED drive circuit 21 by the High state of the signal $G_s$ in the case of FIG. 5a and the LED 22 is not turned on in case of FIG. 5b since number of the code signal bits are even and the signals $G_s$ and $H_s$ are respectively Low.

The arrangement of two flip flops 18 and 18' changes the signal $D_s$ into a one shot signal.

After receipt of the signals D0, D1, D2, ... D15, the T flip flop 14, RST flip flops 18 and 18' are initialized by the signal $C_s$.

The operator is notice that the code pattern can correctly read upon seeing the turning on of the LED 22. In case the LED 22 is not turned on, which represents that the coded information reading device can not read the code pattern correctly, the operator moves the suction cup 5 so as to position the coded information reading device 100 in a correct position P.

In FIG. 5b, the data D2 is High, therefore when the number of bits becomes ten or an even number and when the signals $E_s$ and $F_s$ become High simultaneously, (the signal $E_s$ is represented by Y2 and signal $F_s$ is represented by Z2), the signal $B_s$ becomes Low. D2 is data that is obtained by changing the image on the CRT display unit 2 other than the coded pattern in the code display area 3. This incorrect code is called a false bit.

The code signals shown in FIG. 5a can be represented of a coded pattern by horizontal bars as shown in FIG. 6. When the data is High a horizontal bar is displayed and when the data is Low, no bar is displayed.

Figure 8:
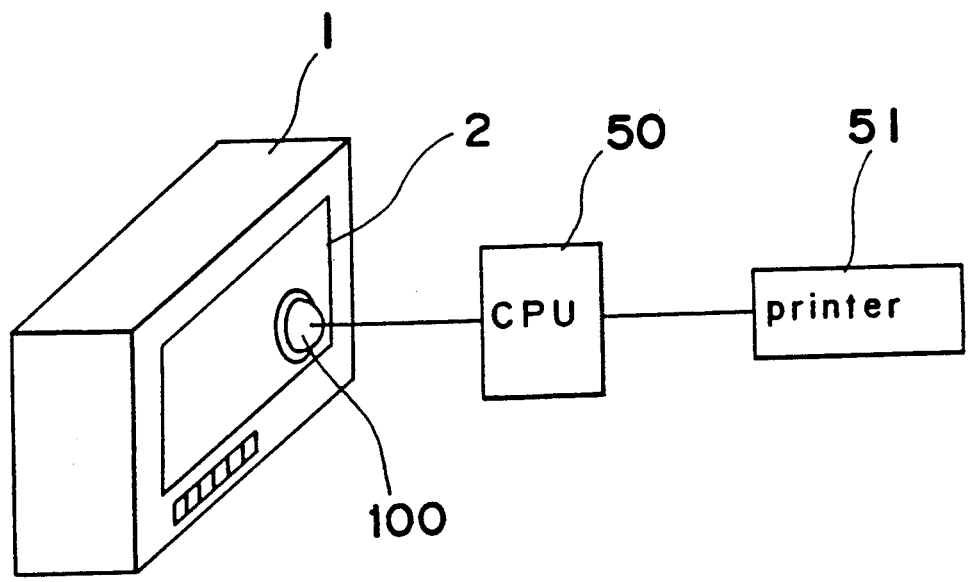
FIG. 8 is a perspective view showing an example of using the coded information reading device according to the present invention.

Referring to FIG. 8, the output of the photo sensor 6 is applied to a central processor unit 50, which reads the code pattern displayed on the CRT display unit 2 and generates code signals corresponding to the code pattern. The code signals are applied to a printer 51 to print the code pattern on a paper.

Figure 9:
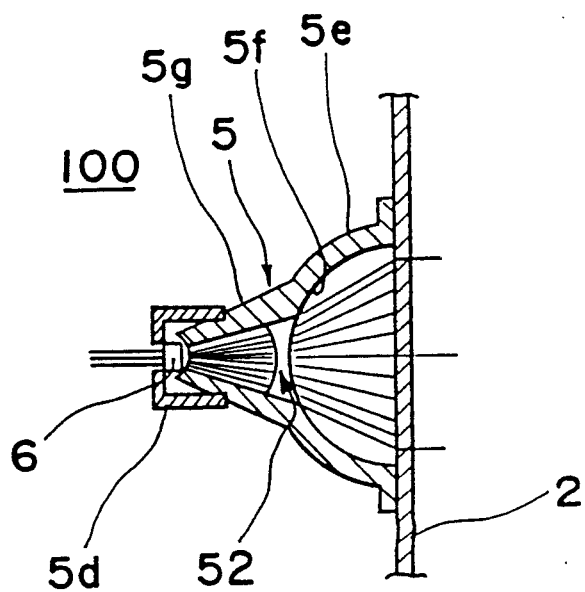
FIG. 9 is a further example of the coded information reading device according to the present invention.

A further example of the coded information reading device 100 is shown in FIG. 9.

In place of using the suction cup 5 as shown in FIGS. 2 or 3, the suction cup 5 may be formed of a transparent material and shaped by the semi-spherical cup portion 5e having a concave surface 5f and a conical portion 5g connected to the semi-spherical cup 5e with the light receiving diode 6' attached to the top portion of the conical portion 5g by a small cylindrical attachment 5d. With the conical portion 5g and the concave surface 5f, a concave lens 52 is formed. When the suction cup is attached to the CRT display unit 2 so as to cover the code display area 3, the rays of light of the code display area are refracted by toward the light receiving diode 6' by the concave lens 52 so that the coded pattern can be read by the light receiving diode 6'.

Figure 10:
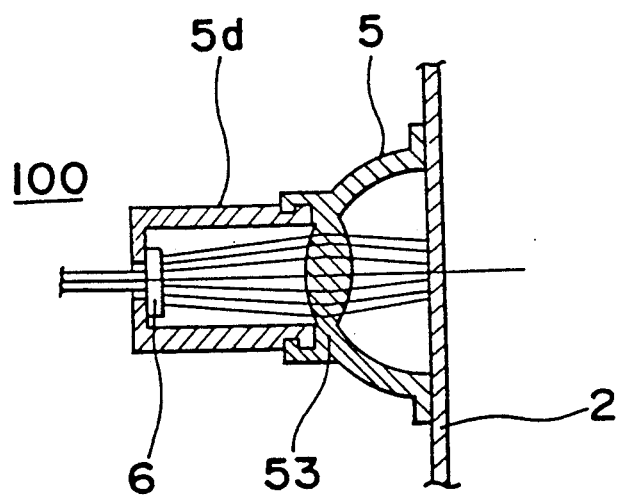
FIGS. 10 to 13 are further examples of the coded information reading device according to the present invention.

Further modification of the suction cup 5 is shown in FIG. 10, wherein a convex lens 53 is formed in the top portion of the suction cup 5 made of transparent material. In this embodiment, the light of the code pattern is refracted toward the light receiving diode 6' by the convex lens 53. In both embodiments shown in FIGS. 9 and 10, since the lens can be molded to be integral with the suction cup 5, the work for assembling the lens in the suction cup can be omitted.

Figure 11:
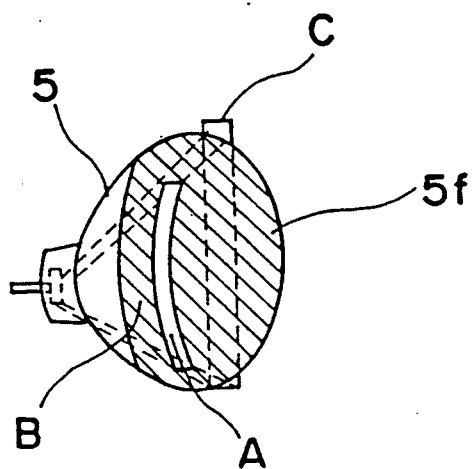

In both embodiments shown in FIGS. 9 and 10, in order to decrease the effect of the ambient light and to facilitate reading only the code pattern, the concave surface 5f of the suction cup 5 except for the area A where the light of the code pattern passes may be masked as shown in the shaded portion B in FIG. 11. The mask may be formed by coating or sputtering. In FIG. 11, the area C denotes the code display pattern area 3 on the CRT display unit 2.

Figure 12:
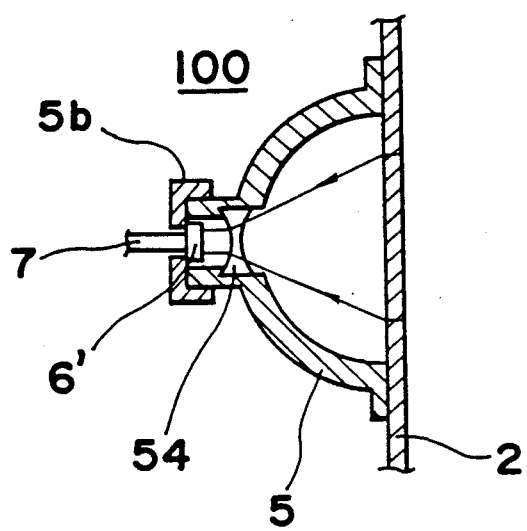
Figure 13:
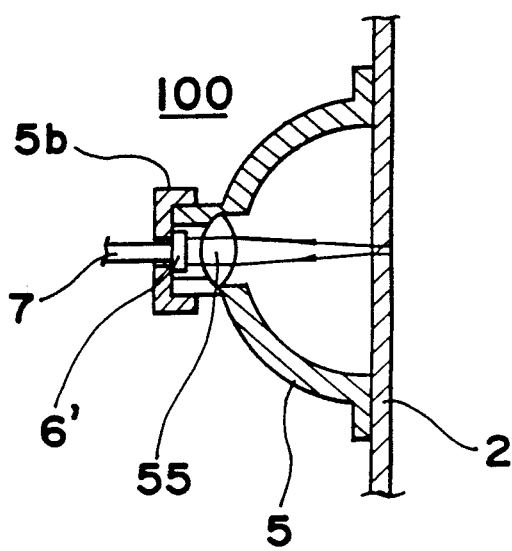
Figure 14:
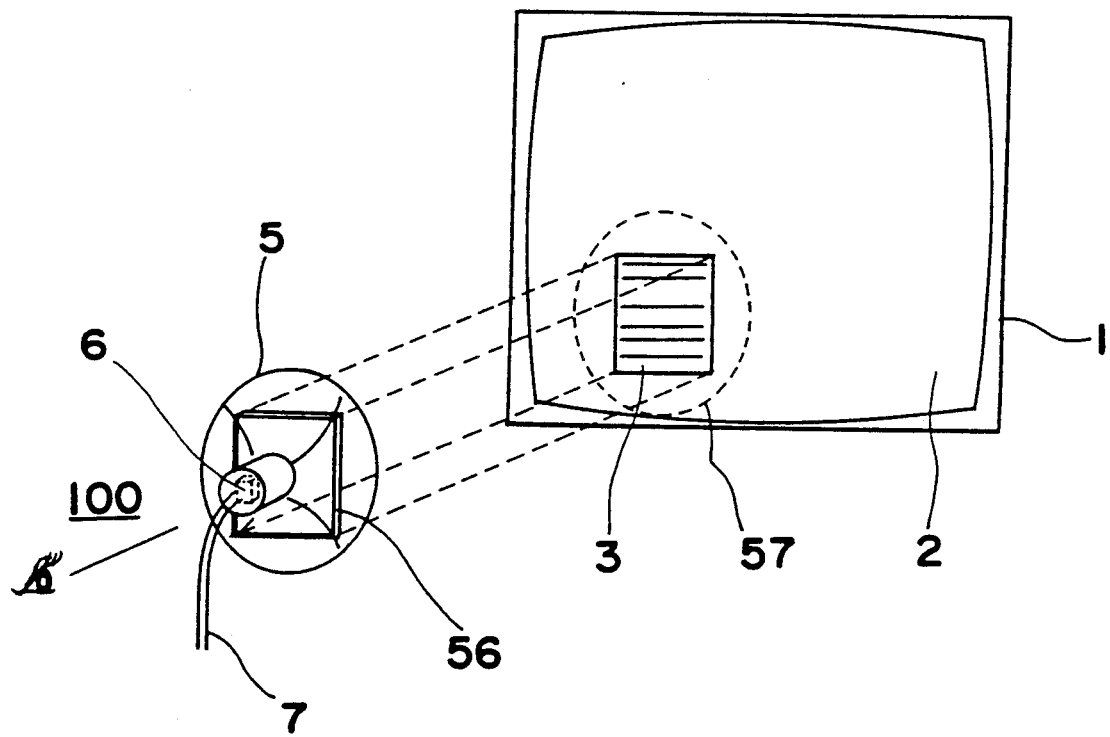
FIG. 14 is a perspective view showing another example of using the coded information reading device, FIG. 15 (a) is a further example of the coded information reading device according to the present invention and 15 (b) shows the coded information of FIG. 15 (a)

A further modification of the suction cup 5 is shown in FIGS. 12 and 13. In FIG. 12, a concave lens 54 is formed on the top portion of the suction cup 5 without using the conical portion 5g as shown in FIG. 9. The concave lens 54 is molded and installed in the suction cup 5 simultaneously with the molding of the suction cup 5. The light of the code pattern display in the code displayed area 3 of the CRT display unit 2 is refracted by the concave lens 54 toward the light receiving diode 6'. The output of the light receiving diode 6' is applied to the central processing unit 50.

As shown in FIG. 13, in place of the concave lens 54, a convex lens 55 may be used. The convex lens 55 is molded integral with the suction cup 5 simultaneously.

The various suction cups mentioned above may be provided with a marking area 56 having the same size and shape as the size and shape of the peripheral edges of the code display area 3 on the outer surface of the transparent suction cup 5.

The code pattern displayed on the area 3 can be read by the photo sensor 6 and the signal representing the code pattern can be transmitted.

The suction cup 5 is attached to the surface of the CRT display unit 2 as shown in FIG. 15 (a) by coinciding the marking areas 56 with the peripheral edges of the code pattern display area 3 by watching the marking area 56 and the peripheral edges of the code display area 3. As the result, the suction cup 5 can be secured to the surface of the CRT display unit to cover the area 57 surrounded by the dotted lines. The portion 58 represents the output area of the bar code as shown in FIG. 5 (b). The light paths of the bar codes are refracted by the lens effect of the suction cup 5 toward the photo sensor 6, whereby the bar code can be detected.

The marking area 56 may be formed by printing or a linear projection or recess. It is essential that the marking area 56 is visually depicted.

FIG. 16 shows a further embodiment of the coded information reading device 100 according to the present invention, wherein a light guide tube 30 has the photo sensor 6 at its bottom portion (right end portion of the light guide tube 30 in FIG. 16) and the photo sensor 6 is connected to a control device (not shown) by the line 7. The photo sensor 6 is disposed so as to receive the light entering the opening 37 defined at the left end of the light guide tube 30. The suction cup 5 is made of rubber or soft plastic resin material having its top end formed with a boss 32. A recess 33 is defined in the boss 32 so that a ball 34 is rotatably fitted in the recess 33. One end of an L character shape arm 35 made of hard material is connected to the ball 34 and the other end of the arm 35 is connected to the light tube 30.

The suction cup 5 is secured to a suitable position near the pattern display area 3 of the CRT display unit 2 and the light tube 30 is moved around the ball 33 through the lever 35 so as to face the opening 37 to the code display area 3 on the CRT display unit 2. Then the code pattern displayed on the CRT display unit 2 can be read by the photo sensor 6.

In case the code display area 3 is displaced to any positions a, b or c, as shown in FIG. 16, the opening 37 of the light guide tube 30 can be directed to the display area a, b and c by moving the lever 35, so that the code can be accurately read.

In place of using the hard arm 35, a flexible arm 38 made of a coiled member may be used. The flexible arm 38 may be formed by a coiled wire covered with a vinyl tube and the arm can easily deformed and keeps its deformed configuration until a further deformation is made. Thus, the opening 37 of the light guide tube 30 can be easily directed to the pattern display area 3 correctly by bending the flexible arm 38 against even a fine displacement of the code pattern display area.

Figure 18:
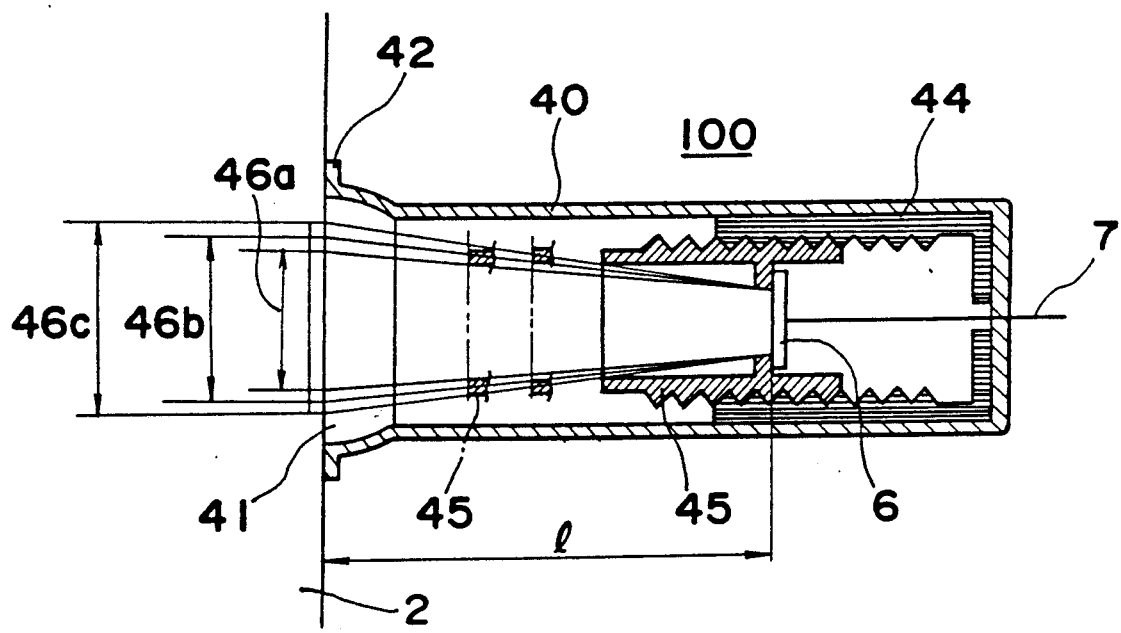

FIG. 18 shows a further embodiment of the code information reading device 100 according to the present invention, wherein the code information reading device is formed of a generally cylindrical member 40 with one end having an opening 41 surrounded by an annular flange 42. There is formed a spherical zone 43 made of easily deformable material between the flange 42 and the cylindrical member 40 to provide a suction cup. A holder 44 in a form of a cylindrical shape is coaxially fitted in another end portion of the cylindrical member 40 and the inner surface of the holder 44 is threaded. A movable threaded cylinder 45 is inserted in the holder 44 so as to move in a direction of the axis of the cylindrical member 40 by rotating the movable cylinder 45. The photo sensor 6 is attached to the end of the movable cylinder 45.

Figure 19:
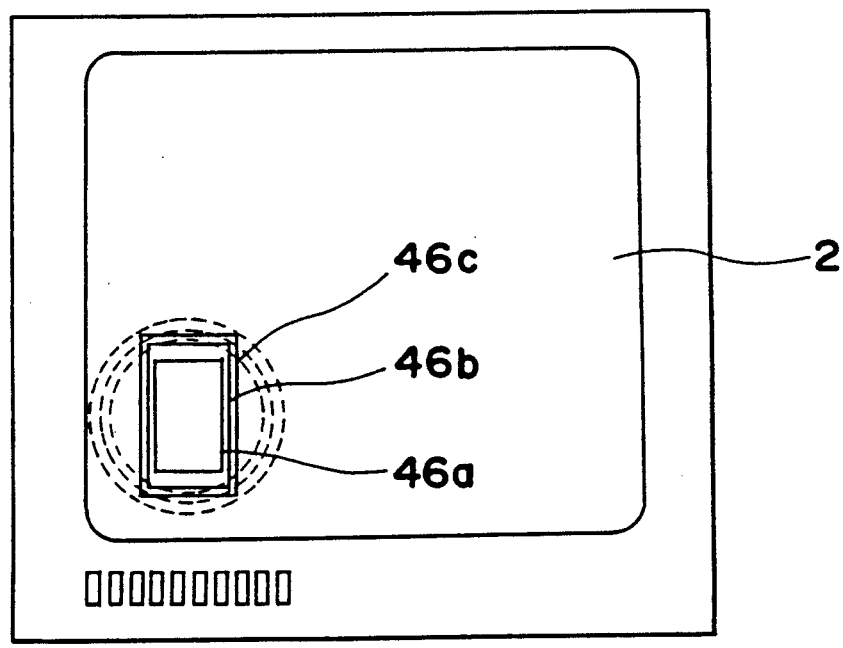
FIGS. 19 and 20 are front views showing further examples of using the coded information reading device.

In the arrangement shown in FIG. 18, the coded information reading device 100 is attached to the CRT display unit 2 in such a manner that the opening 41 opposes the code display area 3 and the cylindrical member 40 is pushed toward the CRT display unit 2 so that the cylindrical member 40 is secured by the suction cup action. In this case, even if the size of the code pattern is varied as 46a, 46b or 46c shown in FIG. 19, it is possible to detect correctly the respective code patterns displayed in various areas 46a, 46b or 46c by rotating the movable cylinder 45 around its axial direction to or away from the CRT display unit 2, whereby the distance λ between the photo sensor 6 and the code pattern displayed on the CRT display unit 2 can be changed. The manner of moving the movable member 45 is not limited to move the member use the screw engagement, but it is essential to change the distance λ.

When reading the code pattern displayed on the CRT display unit by the code information reading device 100 mentioned above, if the code pattern is displayed in the entire code display area 3, the displayed code pattern may exist very close to the original picture image of the television program, therefore it is impossible to distinguish the code pattern from the original picture image, whereby an error in reading the code pattern occurs.

In order to avoid this drawback, the following embodiment provides a black area where no picture is displayed around the code pattern so as to clearly distinguish the code pattern from the original image picture of the television program.

Figure 20:
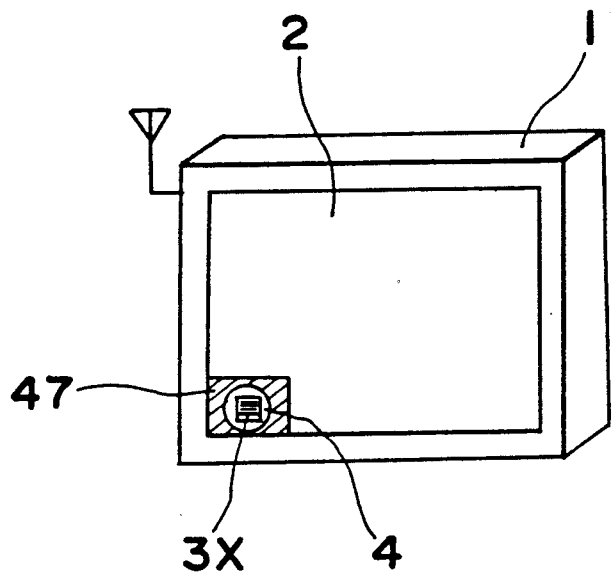
Figure 21:
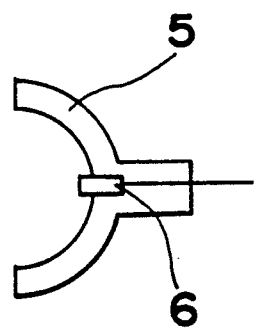
FIG. 21 is a cross sectional view showing a further example of the coded information reading device according to the present invention.
Figure 23:
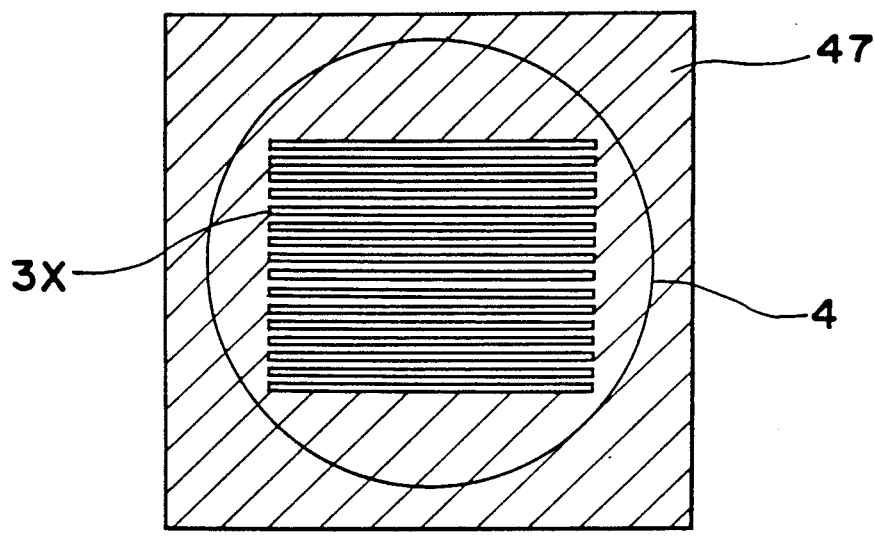
FIG. 23 is an enlarged front view showing an example of the code pattern displayed on the television receiver.

As shown in FIGS. 20 and 23, the sensing area 4 is larger than the code pattern 3X, and there is a black area 47 (although shown in white in the drawings) which is larger than the sensing area 4 around the sensing area 4. In the example, the code is represented by sixteen bars.

Figure 22:
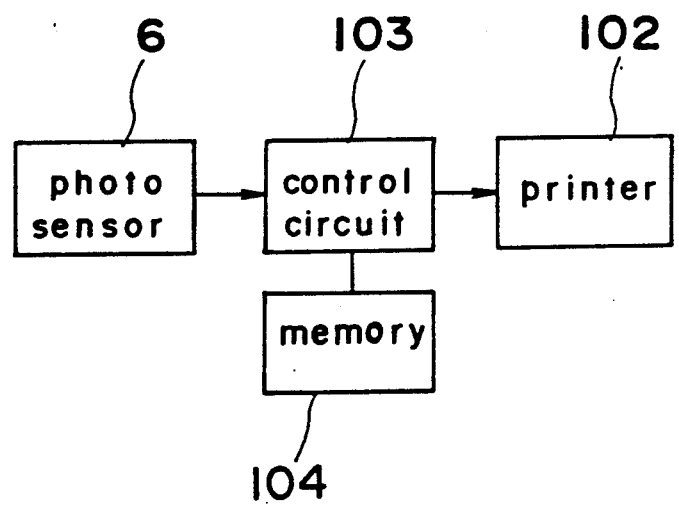
FIG. 22 is a block diagram showing an information processing device for processing the output signal of the coded information reading device according to the present invention.

FIG. 22 shows an example of the code signal processing circuit provided in the receiver wherein the coded signal of the code pattern read by the photo sensor 6 is applied to a control circuit 103, which accesses a memory device 104 to read the output information corresponding to the coded pattern read by the photo sensor 6, so that the output information is applied to the printer 102 by which the code pattern is printed on a sheet of paper.

Details of the arrangement for generation of the black area 47 is explained hereinafter.

Figure 24:
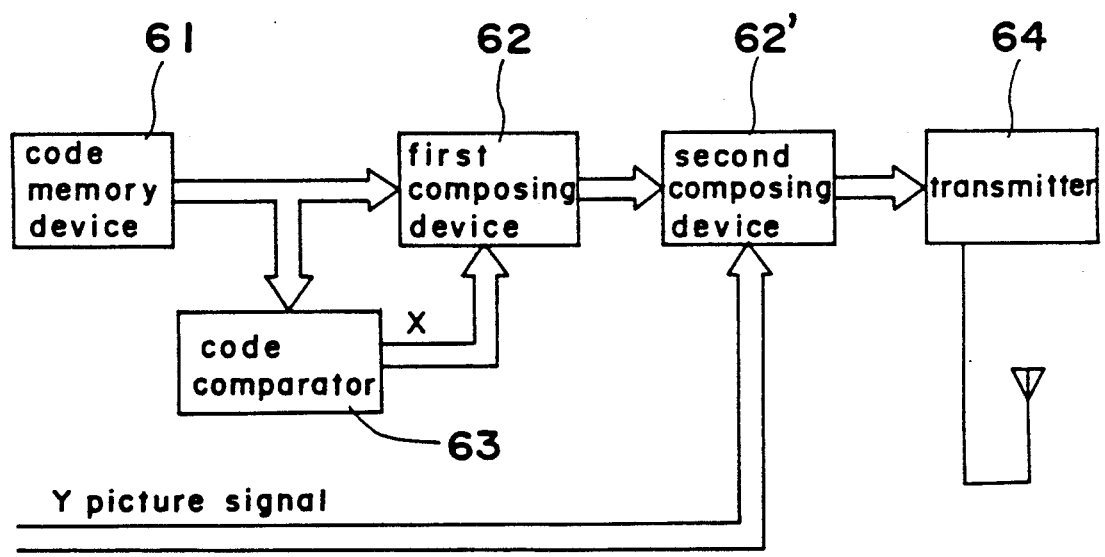
FIG. 24 is a block diagram of a circuit for generation of a black portion around the code pattern on the display unit.
Figure 25:
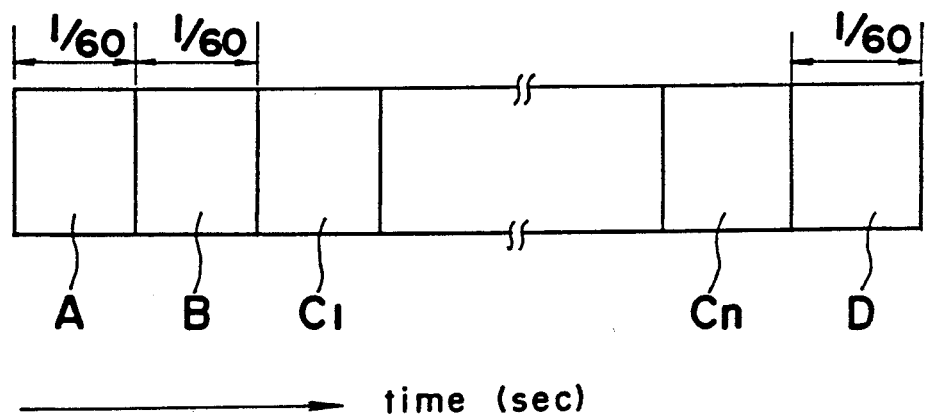
FIG. 25 is a schematic diagram showing an example of a format of a transferred coded signal.

In FIG. 24 showing a block diagram of a transmitter used in this embodiment of the present invention, 61 denotes a code memory device in which coded signals are stored in the format as shown in FIG. 25. The coded signals comprise start code A (START CODE), command code B (COMMAND CODE), data code GROUPS C1, C2, . . . Cn (DATA CODE) and stop code D lined up in the order described above with the start code A disposed at the leading position.

The code memory device 61 outputs the code signals of the start code A, command code B, data code group C1 to Cn and stop code D sequentially.

The output coded signals are inputted to a first composing device 62 and a code comparator 63 each connected to the code memory device 61. The start code A is preliminarily stored in the code comparator 63, which compares the output of the code memory device 61 and start code A and outputs a signal X representing the result of the comparison when the stored start signal and output signal of the code memory device coincide. The signal X is transmitted to the first composing device 62, which produces a black signal larger than the coded signal inputted from the code memory device 61 and composes the coded signal and the black signal with a first priority. In case the signal X is absent, the first composing device 62 outputs directly the coded signal already input thereto.

A second composing device 62' composes the output signal of the first composing device 62 and the picture signal Y. The former signal can be outputted with a priority. The composed signal composed in the second composing device 62' is converted to an electromagnetic wave in the transmitter 14 and broadcasted to the television receiver.

All the codes other than start code A are outputted in every 60 second unit, the receiver receives these codes in a synchronized relation under the control of a timer provided in the receiver.

Figure 26:
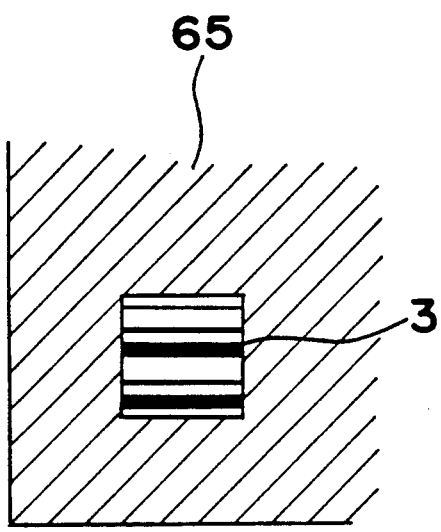
FIGS. 26 and 27 are schematic diagrams showing examples of a display of the code pattern on the display unit of the television receiver with a black portion.
Figure 27:
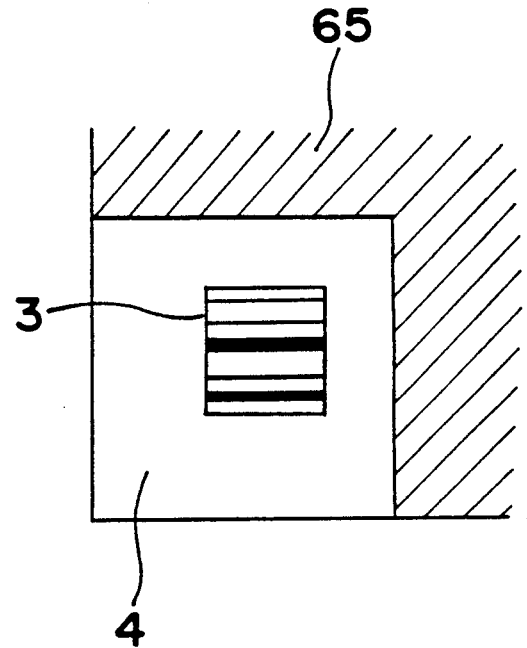

By the arrangement mentioned above, the peripheral edges 4 of the code pattern 3 displayed on the display unit of the television receiver are made black only when the start code A is transmitted from the transmitter. Therefore, it becomes possible to discriminate the code pattern and the normal picture image of the television program when reading the code pattern with the coded information reading device in the receiver. In addition, it becomes possible that the code pattern can be displayed over the entire predetermined code pattern display area. When the transfer of the start code A is completed, the picture 65 of FIGS. 26 and 27 can be displayed in the periphery of the code pattern 3. It is not essential to make the peripheral edges 4 black only when the start code is displayed. For example, it is possible to make the peripheral edges 4 black before the start code A is displayed.

Figure 28:
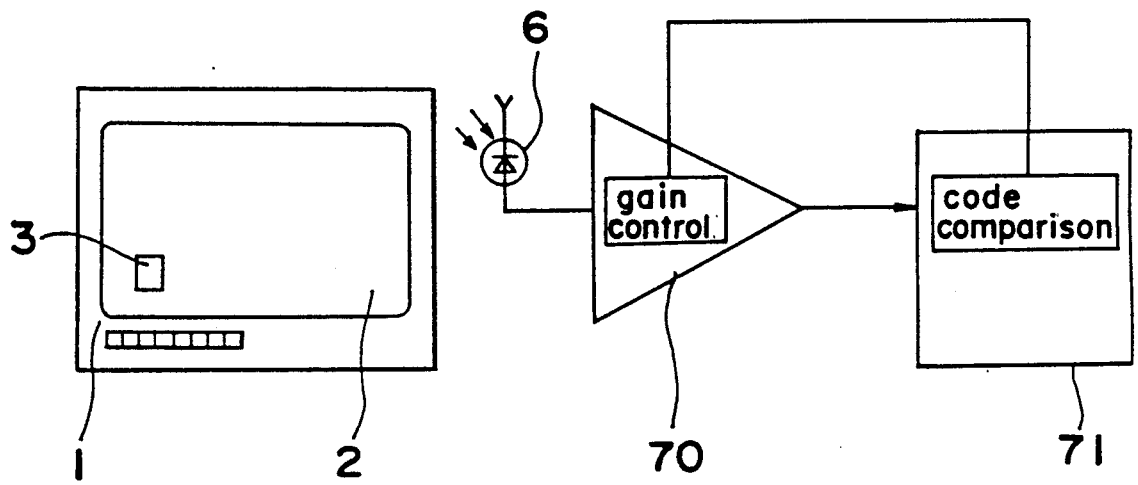
FIG. 28 is a schematic diagram showing another example of an information processing device used in the present invention.

FIG. 28 shows an arrangement for detecting the code pattern displayed in the CRT display unit 2 independent of the brightness of the code pattern.

The CRT display unit 2 is referred to as a data transfer area. The code pattern displayed in the data transfer area can be read by the coded information reading device mentioned above. The output of the photo sensor 6 of the coded information reading device 100 is connected to an amplifier 70 having a plurality of gains and one desired gain can be externally fixed by selecting any one of the gains through the signal applied to the gain control terminal. The output of the amplifier 70 is detected in the LSI 71 which takes the output of the amplifier 70 as the data and controls the gain of the amplifier 70.

Figure 29:
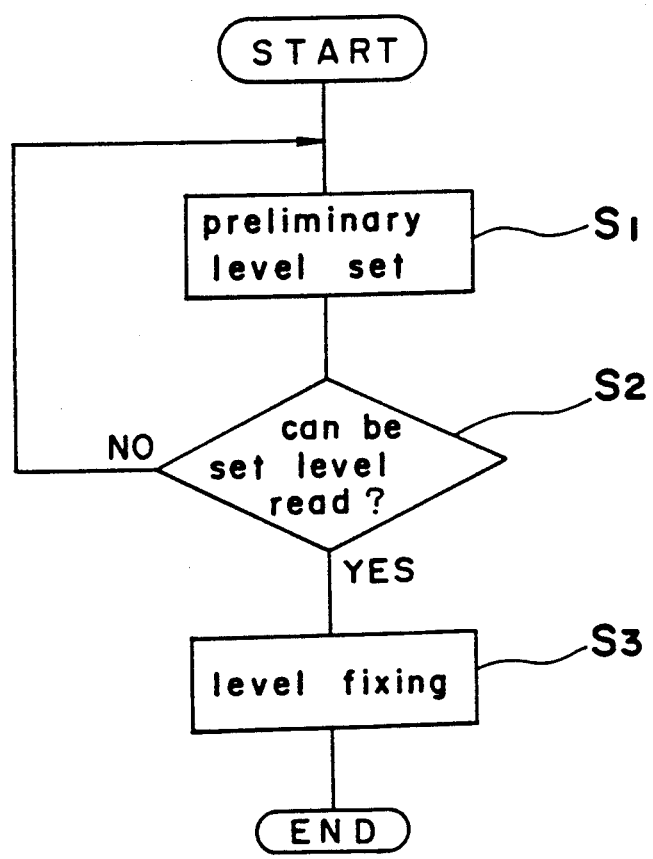
FIGS. 29 and 30 are flow charts showing the operation of the circuit shown in FIG. 28.

The selection of the gain of the amplifier 70 can be explained by the flow chart shown in FIG. 29. In the embodiment, a plurality of gains are set in the amplifier 70.

First, a preliminary gain level is set in the amplifier 70 in the step S1.

In the step S2, the signal obtained in the amplifier 70 and the code for determining the gain or detecting level of the signal are compared. When the code signal representing the code pattern read by the coded information reading device 100 can not be obtained by the amplifier 70, the step goes back to S1 wherein another preliminary gain is set in the amplifier 70 and a similar operation is performed.

In case it is detected in the step S2 that the coded signal obtained in the amplifier 70 and the code for determining the gain (detecting level) coincide, the gain (detecting level) of the amplifier 70 is fixed in the step S3.

The period of time during which the comparison in the step S2 is performed needs (T−t) wherein T is a cyclic period of the input signal and t is the length of time of the signal, and this period of time can be decided according to the general reliability of the system.

Details of the process of determining the gain is explained hereinafter with reference to the flow chart of FIG. 30, in which the steps n1, n2 n3 and n6 correspond to the steps S1, S2 and S3 in FIG. 29.

In order to confirm that the gain set in the step n3 is suitable, steps n4, n5 and n7 are provided. The steps n4, n5 and n7 improve the reliability of the system.

In the step n3, a gain of the amplifier 70 is preliminarily set and it is judged in the step n4 whether or not the output level of the code signal amplified in the amplifier 70 can be read. In case the code signal can be read, the step goes to n5 wherein the preliminary set gain is fixed in the amplifier 70. In case the code signal can not be read, the step goes to n7 wherein a condition is set by examining the present gain and a higher gain and lower gain and the step goes to n6 wherein the correct gain is selected depending on the condition set in the step n7. Then the step goes to n2.

Through the process mentioned above, the code for determining the gain can be transmitted to the amplifier 70 before the necessary signal is transmitted to the amplifier 70 without giving any effect to the television receiver when no signal is present, a correct gain of the amplifier 70 can be obtained in any case so that the S/N ratio can be improved.

Figure 31:
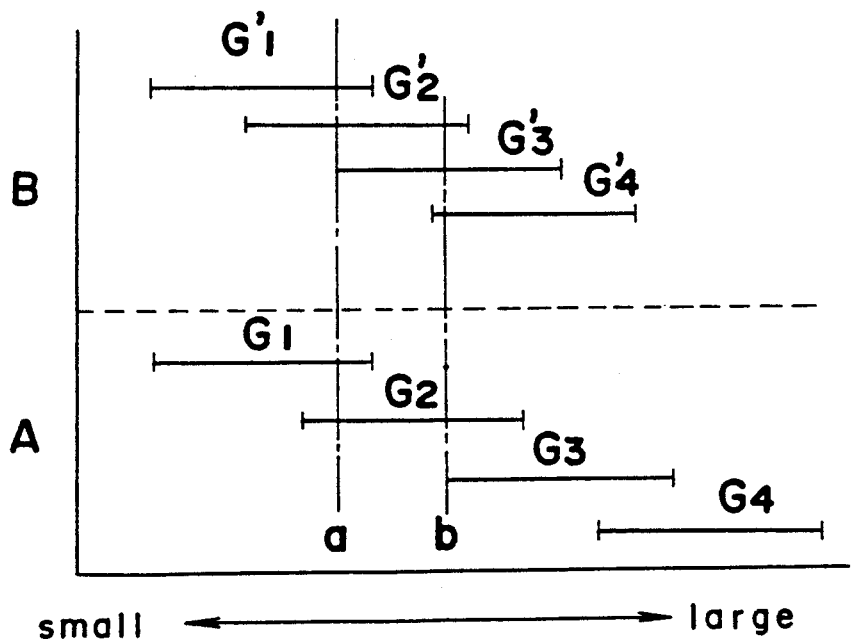
FIG. 31 is a graph showing various ranges of gain of an amplifier used in the circuit shown in FIG. 28.

The gain of the amplifier 70 has a band for obtaining the code signal, and the respective gain bands have overlapped portions as shown in FIG. 31.

FIG. 31 shows two different cases A and B. In FIG. 31, there are four gains for covering various levels of input signals. The horizontal axis represents the magnitude of the input level.

In case of A, there are provided gains G1, G2, G3 and G4, and in case of B gains G1', G2', G3' and G4' are provided.

In case the gain is set in the range A, assuming that the level of the input signal is a, the input signal can be read by the gains G1 or G2 according to the process shown in FIG. 29, any one of the gains G1 or G2 can be fixed according to the order of setting the gain.

However, assuming that the input level is b, the signal can be surely obtained when the gain is G2, to the contrary, when the gain is G3, such an unstable state may occur that there may be one case where the signal can not be obtained and another case where the signal can be obtained depending on an external condition, with the gain happening to be set to G3.

On the other hand, in case of B, there are two cases where the signal can be obtained. Namely, the first case is when the gain of the amplifier 70 is any one of the gains G1', G2' and G3' and the second case is when the gain of the amplifier 70 is any one of the gains G1' and G2'.

In case the signal representing the code pattern can be read by any one of three gains G1', G2' and G3, the gain of the amplifier 70 is set by the intermediate gain G2'. In case the signal can be read by one of the gains G1' and G2', it can be decided by repeating the process shown in FIG. 29 which gain is to be used for surely obtaining the signal. When the gain is decided, the selected gain of G1' or G2' is set in the amplifier 70.

The code used for deciding the gain of the amplifier 70 may be attached in the leading portion of the transmitted data, and such code can be used as a dummy code or start code.

Figure 30:
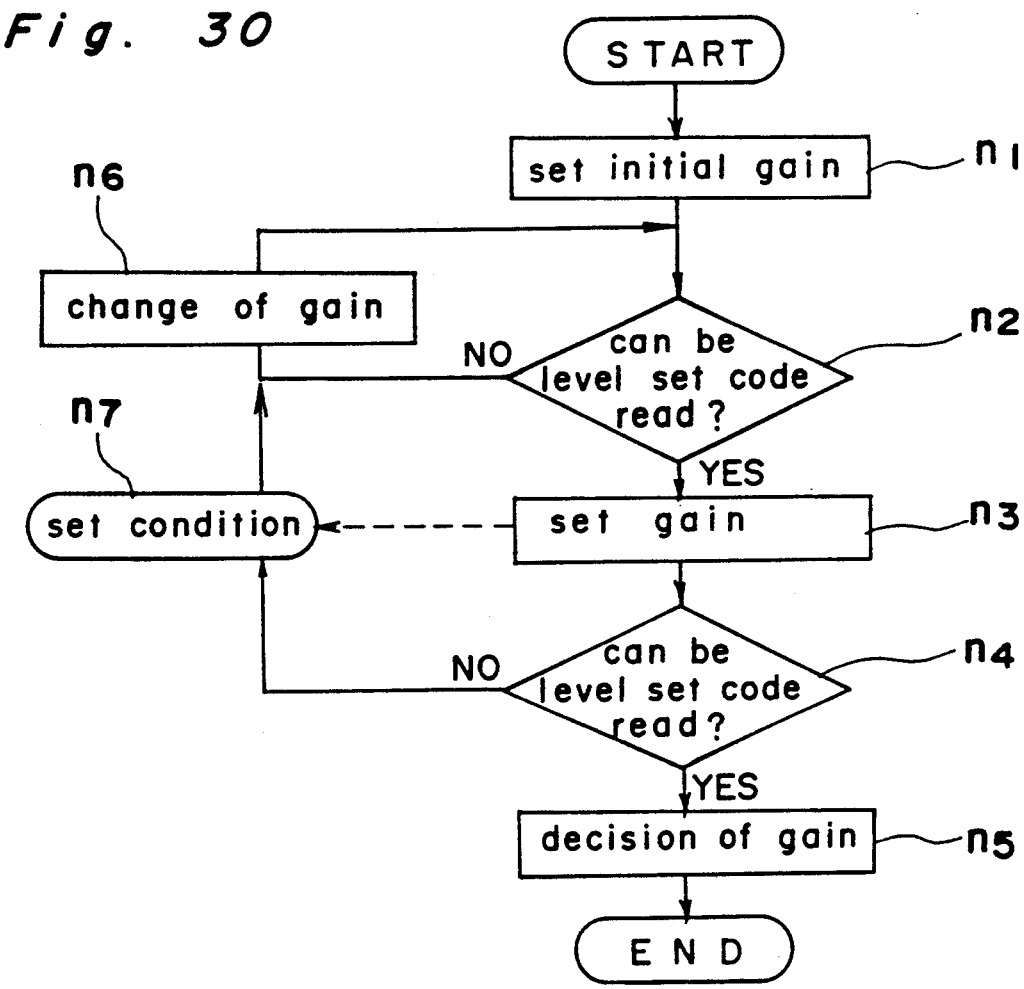

One advantage of the embodiment shown in FIGS. 29 to 31 is in that since the gain of the amplifier 70 which amplifies the signal from the coded information reading device can be controlled by the output of the amplifier 70 when the code pattern is read by the coded information reading device from the CRT display unit 2, a suitable gain can be set automatically, and it is assured to read the code pattern, even if the output level of the display unit changes widely, whereby there is no need to adjust the level of the brightness of the display unit at the time of transfer of the data.

Another advantage of the embodiment shown in FIGS. 29 to 31 is in that since there are provided at least three levels of gain so that two or more gains can be used for one input signal, when there are an odd number of selectable gains for one input signal, the central gain among the selectable gains is selected. In case there are an even number of selectable gains, two gains in the central portion among the selectable gains are selected. Therefore, it is easy to select a gain most suitable for the input among a number of gains.

The device according to the present invention may be applied to read the coded information displayed not only on a CRT display unit but also other various types of display units such as liquid crystal display units or the like. In addition the coded information is not limited to a bar code and other types of coded information can be used in the present invention.

What is claimed is:

1. A device for reading coded information patterns displayed on a display unit and outputting information signals corresponding to said coded patterns, comprising:
    a substantially semi-spherical suction cup with a wide end and a narrow end, for attaching to a display surface of said display unit; and
    photosensor means, integrally mounted within the narrow end of said substantially semi-spherical suction cup, for reading said coded information patterns,
    said coded information patterns being bar code patterns utilized by a viewer.

2. The device according to claim 1, further comprising:
    a light transmitting tube supported by the narrow end of the substantially semi-spherical suction cup;
    said photosensor means integrally installed in the light transmitting tube for reading the bar code pattern displayed on the display unit.

3. The device according to claim 1, further comprising:
    a lens disposed within the substantially semi-spherical suction cup and between the photosensor means and the bar code pattern, for refracting light rom the bar code pattern toward the photosensor means.

4. The device according to claim 1, further comprising:
    means for detecting whether or not the photosensor means is placed at a position for detecting the bar code pattern; and
    means for warning when the photosensor means is not positioned so as to read the bar code pattern.

5. The device according to claim 1, wherein said substantially semi-spherical suction cup further comprises means for adjusting the distance between the display unit and the photosensor means.

6. The device according to claim 1, further comprising:
    amplifying means for amplifying the information signal obtained from the bar coded information pattern displayed on the display unit, including means for changing the gain of the amplifying means based on the output of the amplifying means at the time of display of the code signal.

7. The device according to claim 1, further comprising:
    amplifying means for amplifying the information signal obtained from the bar coded information pattern displayed on the display unit, said amplifying means being provided with a plurality of ranges of gain assigned for input levels of he amplifying means, the respective ranges of gain having gains in common to at least two other ranges of gain.

8. The device, as claimed in claim 3, wherein said lens is a convex lens.

9. The device, as claimed in claim 3, wherein said lens is a concave lens.

10. The device, as claimed in claim 1, further comprising:
    a narrow slit-like opening, disposed between said photosensor means and said display surface, for directing light from said bar coded pattern towards said photosensor to enhance the reading of said bar coded pattern.

11. The device, as claimed in claim 3, wherein said lens is integrally mounted within said substantially semi-spherical suction cup at a point between said narrow end and said wide end.

12. The device, as claimed in claim 2, further comprising:
    detecting means, connected to said photosensor means, for detecting whether or not said photosensor means is correctly positioned so as to read the displayed bar code pattern; and
    warning means, connected to said detecting means, for indicating to a user, whether or not said photosensor means is correctly positioned.

13. The device, as claimed in claim 12, wherein said warning means is an LED.

14. The device, as claimed in claim 13, wherein said LED is ON when said photosensor means is correctly positioned so as to read said displayed bar code pattern and said LED is OFF when said photosensor means is not correctly positioned.

15. A device as claimed in claim 1, wherein said substantially semi-spherical suction cup is made of a transparent material.

16. A device for reading coded information patterns displayed on a display unit and outputting information signals corresponding to said coded patterns, comprising:
    a substantially semi-spherical suction cup with a wide end and a narrow end, for attaching to a display surface of said display unit; and
    photosensor means, integrally mounted within the narrow end of said substantially semi-spherical suction cup, for reading said coded information patterns, said coded information patterns being bar code patterns utilized by a viewer, wherein said substantially semi-spherical suction cup comprises a marking portion for positioning the substantially semi-spherical suction cup at a position on the display unit so as to expose the photosensor to the bar code pattern.

17. The device as claimed in claim 16, wherein said substantially semi-spherical suction cup is transparent so as to allow a user to position said marking portion over said bar code pattern.

18. The device, as claimed in claim 16, wherein said marking portion is substantially the same size and shape as the peripheral edges of said bar code pattern.

* * * * *